United States Patent
Lysdal et al.

(10) Patent No.: US 11,768,332 B1
(45) Date of Patent: Sep. 26, 2023

(54) WAVELENGTH SPLITTER CABLE WITH MECHANICAL KEY

(71) Applicant: MELLANOX TECHNOLOGIES, LTD., Yokneam (IL)

(72) Inventors: Henning Lysdal, Roskilde (DK); Barak Gafni, Sunnyvale, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/867,889

(22) Filed: Jul. 19, 2022

(51) Int. Cl.
*G02B 6/38* (2006.01)

(52) U.S. Cl.
CPC ......... *G02B 6/3831* (2013.01); *G02B 6/3877* (2013.01)

(58) Field of Classification Search
None
See application file for complete search history.

(56) References Cited

U.S. PATENT DOCUMENTS

| | | | | |
|---|---|---|---|---|
| 10,527,810 B2 * | 1/2020 | Li | ................ | G02B 6/4261 |
| 10,564,359 B2 * | 2/2020 | Li | ................ | G02B 6/2938 |
| 11,169,330 B2 | 11/2021 | Lysdal et al. | | |
| 11,336,374 B1 * | 5/2022 | Gridish | ................ | G02B 6/4246 |
| 2002/0009266 A1 * | 1/2002 | Zdinak | ................ | G02B 5/18 385/24 |
| 2017/0264045 A1 * | 9/2017 | Eslava | ................ | H01R 13/6205 |
| 2019/0162923 A1 * | 5/2019 | Li | ................ | G02B 6/4261 |
| 2019/0204510 A1 * | 7/2019 | Li | ................ | G02B 6/2938 |
| 2019/0377147 A1 * | 12/2019 | Vilner | ................ | H04B 10/2575 |
| 2022/0043214 A1 | 2/2022 | Lysdal et al. | | |
| 2022/0066106 A1 * | 3/2022 | Nakanishi | ................ | G02B 6/403 |
| 2022/0137305 A1 * | 5/2022 | Tseng | ................ | G02B 6/3831 385/134 |

* cited by examiner

*Primary Examiner* — Jerry Rahll
(74) *Attorney, Agent, or Firm* — SHERIDAN ROSS

(57) ABSTRACT

An optical cable includes a single optical connector configured for insertion into an optical receptacle so as to receive optical signals at a plurality of different wavelengths from the optical receptacle, and multiple electrical connectors, configured for insertion into respective electrical receptacles. The optical cable further includes a plurality of optical fibers, having respective first ends connected together to the single optical connector so as to receive the optical signals. Each of the optical fibers has a respective second end coupled to a respective one of the electrical connectors. Each electrical connector includes a keyed portion to mate with an indentation on a transceiver.

20 Claims, 12 Drawing Sheets

WAVELENGTH SPLITTER CABLE WITH MECHANICAL KEY

FIELD OF THE INVENTION

The present invention relates generally to opto-electronic devices, and particularly to active optical cables.

BACKGROUND

Data centers that handle substantial amounts of data commonly utilize high-capacity optical switch assemblies. These switch assemblies send and receive data to and from multiple servers in the form of optical signals with data rates reaching hundreds of Gb/s. Setting up a new network device, such as a switch, requires a technician to connect many cables between the device and nodes such as servers. The process is time consuming and a source of many errors as a result of technicians misconnecting cables between devices and nodes.

SUMMARY

Embodiments of the present invention that are described hereinbelow provide an improved optical cable, which can be used, for example, in connecting switching assemblies to servers.

There is therefore provided, in accordance with an embodiment the present invention, an optical cable, which includes a single optical connector configured for insertion into an optical receptacle so as to receive optical signals at a plurality of different wavelengths from the optical receptacle. The optical cable includes multiple electrical connectors, configured for insertion into respective electrical receptacles. In some embodiments, each electrical connector includes a transceiver configured to convert the optical signals into electrical output signals for output to an electrical receptacle into which the electrical connector is inserted. In other embodiments, each electrical connector is configured to connect to a transceiver which may be configured to convert the optical signals into electrical output signals for output to an electrical receptacle to which the transceiver is connected. The optical cable further includes a plurality of optical fibers, having respective first ends connected together to the single optical connector so as to receive the optical signals, and each of the optical fibers having a respective second end coupled to a respective one of the electrical connectors. Wavelength selection optics are associated with the optical fibers so that the transceiver in each of the electrical connectors, or the transceiver to which each electrical connector is connected, receives the optical signals at a different respective one of the wavelengths.

In a disclosed embodiment, the wavelength selection optics include a wavelength splitter in the single optical connector, such that each of the optical fibers receives and conveys the optical signals only at the respective one of the wavelengths. In one embodiment, the wavelength splitter includes an optical wavelength-division demultiplexer. In a further embodiment, the wavelength selection optics include a wavelength selection filter associated with each of the multiple electrical connectors. The wavelength selection filter may include an optical bandpass filter. Alternatively, the wavelength selection optics includes an optical wavelength-division demultiplexer.

In another embodiment, a transceiver is further configured to convert an electrical input signal received from the electrical receptacle into a respective optical output signal. The optical fibers include fiber pairs, each pair including a first optical fiber configured to convey the optical signals from the single optical connector to the respective one of the electrical connectors and a second optical fiber configured to convey the optical output signal from the transceiver to the single optical connector. In a disclosed embodiment, each transceiver is configured to generate the respective optical output signal at a different, respective wavelength.

There is also provided, in accordance with an embodiment of the present invention, a method for producing an optical cable. The method includes providing an optical connector configured for insertion into an optical receptacle so as to receive optical signals at a plurality of different wavelengths from the optical receptacle, and providing multiple electrical connectors configured for insertion into respective electrical receptacles. In certain embodiments, each electrical connector includes a transceiver configured to convert the optical signals into electrical output signals for output to an electrical receptacle into which the electrical connector is inserted. In other embodiments, each electrical connector is designed to mate with a transceiver configured to convert the optical signals into electrical output signals for output to an electrical receptacle into which the electrical connector is inserted. Respective first ends of a plurality of optical fibers are connected together to the single optical connector so as to receive the optical signals. A respective second end of each of the optical fibers is connected to a respective one of the electrical connectors. Wavelength selection optics are associated with the optical fibers so that the transceiver in each of the electrical connectors, or to which each of the electrical connectors is connected, receives the optical signals at a different respective one of the wavelengths.

There is also provided, in accordance with an embodiment of the present invention, a method for networking, which includes providing an optical cable including a single optical connector configured to receive optical signals at a plurality of different wavelengths, and multiple electrical connectors. Each electrical connector either includes a transceiver configured to convert the optical signals into electrical output signals or is designed to mate with a transceiver configured to convert the optical signals into electrical output signals. The optical cable further includes a plurality of optical fibers, having respective first ends connected together to the single optical connector, while each of the optical fibers has a respective second end coupled to convey the optical signals at a respective one of the wavelengths to a respective one of the electrical connectors. The single optical connector is inserted into an optical receptacle in a network hub, and the electrical connectors are inserted into respective electrical receptacles of multiple, different network nodes.

To save power associated with operating a switch, it is desirable to co-package the switch with "optical engines" (small, high density optical transceivers sitting inside the switch ASIC package). Space constraints require the optical connectivity to use WDM—i.e., to carry at least four 100 Gb/s inputs or outputs respectively in each optical fiber to limit the number of optical fibers to such a co-packaged switch. This means that each fiber and each front panel optical connector carries e.g., 4×100 Gb/s.

In a switch-to-server application a single 400 Gb/s connection may overwhelm the server. It is desirable to split the connection into a plurality of independent connections, each of which can go to separate servers. This implies that each of the servers may receive a different wavelength from the switch and will be required to respond on the same wavelength.

It is possible to detect wavelength in a server-side transceiver and have a wavelength-tunable laser in the output of this transceiver. However, such a solution is excessively costly. This present disclosure offers a cost-efficient alternative.

A cable system may be implemented which use transceivers which are permanently connected to optical fiber to function as a connector system for connecting the fiber to a node such as a server. However, such an implementation would require the user to manage that four transceivers which any given fiber harness is connected to has exactly one of each of four wavelengths. This is a significant installation and inventory burden on the user, requiring transceivers of different wavelengths.

The present disclosure allows the interface between fiber and transceiver to be detachable. This greatly simplifies installation, since it can be cumbersome to drag a bulky transceiver through cable trays in the datacenter The present disclosure solves this problem, by introducing a mechanical key to the optical connectors of the fiber and the server-end transceivers, securing that only matching fiber and transceiver pairs can be connected.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Overview

Figure 1:
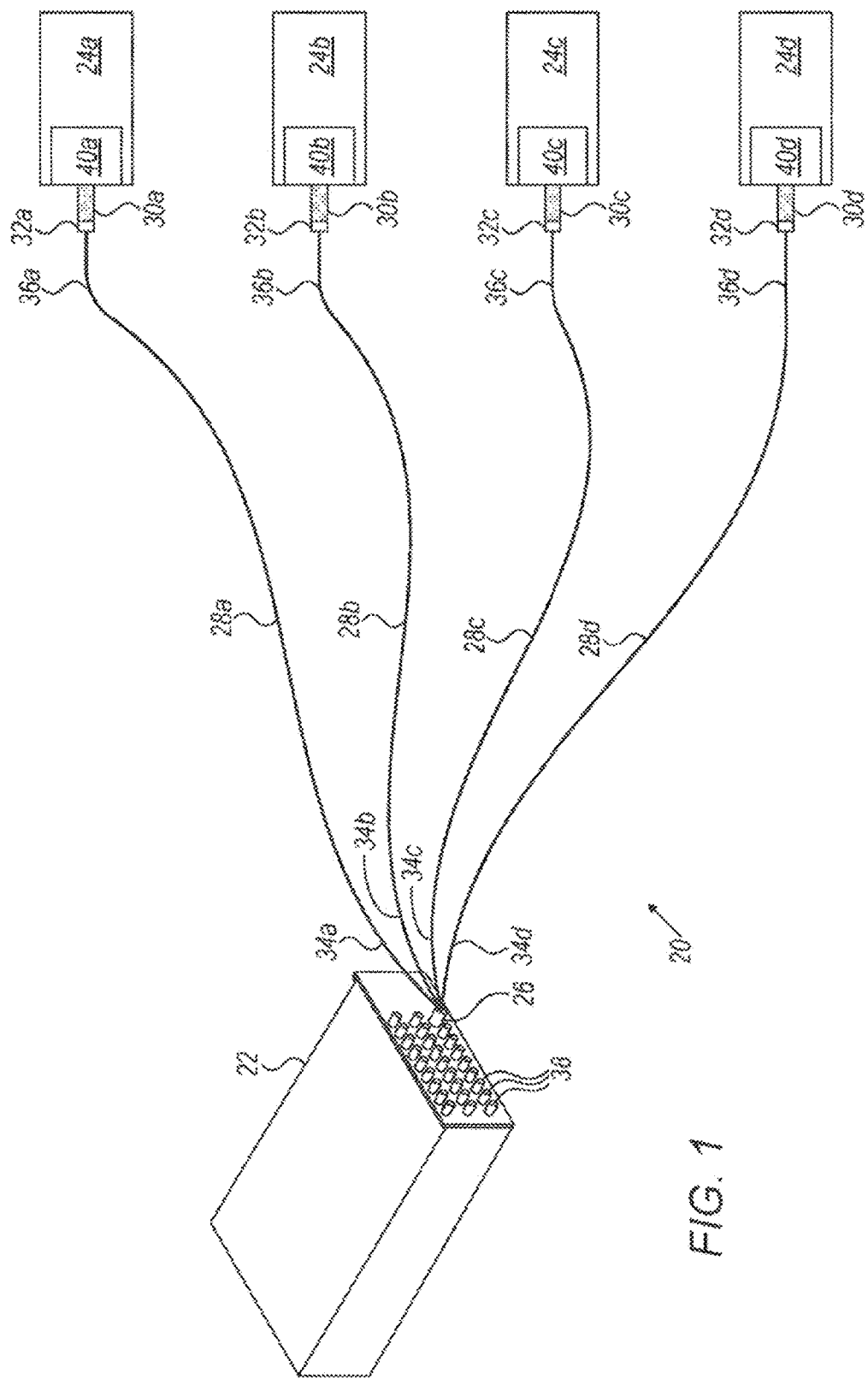
FIG. 1 is a schematic pictorial illustration of an active optical cable connecting a switch assembly to four servers, in accordance with an embodiment of the invention.

High-capacity optical switch assemblies switch multiple channels of data at high data rates, with the number of channels reaching several hundreds and data rates reaching hundreds of Gb/s (Gb/s=109 bits per second). In order to save power, it is desirable to co-package the switch itself with "optical engines," which typically are small, high-density optical transceivers located within an application-specific integrated circuit (ASIC) or within an ASIC package together with the switch.

The switch assembly is contained in a rack-mounted case, with optical receptacles on its front panel for ease of access. The signals from and to the ASIC are conveyed to and from the optical receptacles using optical fibers.

Space constraints of the switch and the front panel limit the number of optical fibers connected to the ASIC and optical receptacles on the panel. Therefore, the optical signals emitted and received by the switch are multiplexed using wavelength-division multiplexing, so that each fiber, along with the associated optical receptacle, carries multiple optical signals. For example, each fiber may carry four channels of 100 Gb/s each, at four different, respective wavelengths, to and from the corresponding optical receptacle, for a total data rate of 400 Gb/s (denoted as 4×100 Gb/s).

In many cases, the multiple communication channels carried at different wavelengths on the same fiber are directed to and from different network nodes. For example, each of the 100 Gb/s component signals on a 4×100 Gb/s optical link may be directed to a different server. Therefore, there is a need for an optical cable that is capable of splitting the multiplexed optical signal into multiple component signals at different, respective wavelengths, and be capable of conveying each of these signals to a different network node. For simplicity of installation and use, it is desirable that the optical cable be "active," meaning that transceivers in the cable convert each of the multiple optical signals to a standard electrical form (and vice versa). As a result, the network nodes need process only electrical signals and will be indifferent to the actual wavelength of the optical channel that is directed to each of them.

To further simplify installation and use, it is sometimes desirable that the optical cable be detachable from the transceivers so that a smaller cable may be routed through an installation. Each optical cable may, instead of comprising a transceiver, be designed to mate with a particular transceiver. The transceiver may be connected to a node, such as a server, and be used to connect a connector of each cable to the node as described herein.

The embodiments of the present invention that are described herein address the above needs by providing a simple, active optical cable that is easy to connect to a wavelength-multiplexed hub, such as a high-speed switch, at one end, and that provides respective electrical signals to multiple nodes, such as servers, at the other end. The active optical cable incorporates a passive optical splitter at the wavelength-multiplexed end and either transceivers at the multiple ends or connectors at the multiple ends, where the connectors are designed to mate with transceivers connected to the network nodes. Wavelength selection optics within the cable between the wavelength-multiplexed end and the transceivers direct each of the multiplexed wavelengths to a different transceiver.

In one or more of the disclosed embodiments, the optical cable comprises multiple optical fibers, a single optical connector, multiple electrical connectors (one for each of the optical fibers), and wavelength selection optics. The optical connector is configured for insertion into an optical receptacle, such as on a switch assembly, so as to receive optical signals at multiple different wavelengths from the receptacle. The multiple electrical connectors are configured for insertion into electrical receptacles, such as on respective servers, or into transceivers. Each electrical connector either comprises a transceiver that converts the received optical signals into electrical output signals for output to the electrical receptacle into which the electrical connector is inserted or is designed to mate with a transceiver that converts the received optical signals into electrical output signals for output to an electrical receptacle to which the transceiver which the electrical connector is inserted is connected. The optical fibers have their respective first ends connected together to the single optical connector so as to receive the optical signals, and each of the optical fibers has its respective second end coupled to an electrical connector. The wavelength selection optics are associated with the optical fibers so that the transceiver receives the optical signals at a different wavelength.

Thus, as in the previously described example, an optical signal comprising four 100 Gb/s signals at four different wavelengths (4×100 Gb/s) can be conveyed from one optical receptacle of a switch assembly to four electrical server receptacles. This is accomplished by connecting the active optical cable between the optical receptacles of the switch assembly and electrical receptacles of the servers. The active optical cable comprises four optical fibers joined together at their respective first ends at a single optical connector, whereas each of the four second ends of the fiber is connected to a separate electrical connector. Within the optical connector, the first ends are joined using, for example, a standard, spectrally non-selective 1-to-4 waveguide splitter. Each second end is connected via wavelength selection optics (for example, a bandpass filter or a wavelength-division demultiplexer) to a transceiver within the electrical connector.

Alternatively, the wavelength selection optics may comprise a 1-to-4 wavelength-specific splitter (for example, a wavelength-division demultiplexer) within the optical connector, and each second end is connected directly to a transceiver without a need for additional wavelength selection optics.

The optical connector receives the multi-channel optical signal from the optical receptacle. In embodiments in which the optical splitter has no selectivity with respect to wavelength, the optical signal is split among the multiple fibers so that each fiber carries all of the optical signals at the multiple wavelengths. The wavelength selection optics in each fiber may have a different respective passband, so that each transceiver receives only the optical signal at its own assigned wavelength. The transceiver converts this optical signal to an electrical signal for output to the electrical receptacle. Alternatively, when the optical splitter is a wavelength-specific splitter, each of the multiple fibers carries a signal at a different, respective wavelength directly to a transceiver.

Having an active optical cable with only one optical connector for a signal with multiple wavelengths simplifies the task of a technician connecting the cable: She only needs to ascertain that the optical connector is connected to the correct optical receptacle at one end of the cable, and the correct electrical receptacles at the other end, without having to be concerned with the wavelengths carried by the cable. Furthermore, having one active optical cable for multiple wavelengths reduces the inventory and the cost of cabling. As described herein, the optical connectors may be keyed to match with a correct optical receptacle or transceiver at the node. In this way, the technician's task may be further simplified by removing the possibility of the technician connecting an optical connector to a wrong receptacle.

Although the description above, for the sake of simplicity, refers mainly to transmission of signals from a hub to multiple network nodes, in common embodiments of the present invention, the active optical cable is configured for transmitting wavelength-multiplexed signals in two directions between the hub and the nodes. In such embodiments, the transceiver is configured to convert a received electrical signal from the electrical receptacle into an optical output signal at an assigned wavelength, as well as converting the received optical signal into an electrical signal as described above. In such embodiments, the optical fibers comprise four fiber pairs (rather than four single fibers). The first optical fiber of the pair conveys the optical signals from the single optical connector to the respective electrical connector. The second optical fiber conveys the optical output signal from the respective electrical connector to the single optical connector, where all four second optical fibers are joined together by an optical joiner (for example, an optical splitter configured to function in reverse), thereby generating a wavelength-multiplexed input to the optical receptacle of the hub.

In these bidirectional embodiments, each of the four transceivers is typically configured to emit an optical signal at the same wavelength as the signal it received. Alternatively, each of the transceivers may emit at another wavelength, as long as each wavelength is emitted by only one of the transceivers, so that the hub is able to distinguish between the signals from the different transceivers.

First Embodiment

FIG. 1 is a schematic pictorial illustration of an active optical cable 20 connecting a switch assembly 22 to four servers 24a, 24b, 24c, and 24d, in accordance with an embodiment of the invention. In the described embodiment, as well as those following, a connection to four servers of four 100 Gb/s signals (4×100 Gb/s) is again used as an example. Other numbers of servers and signals, such as 2, 3, 5, 6, or even higher, as well as other data rates, may be used in alternative embodiments. Furthermore, active optical cables of the sort in accordance with embodiments of the invention may be used not only in this sort of connections between switches and servers, but also in other applications in which network nodes are connected using optical wavelength multiplexing.

Figure 6:
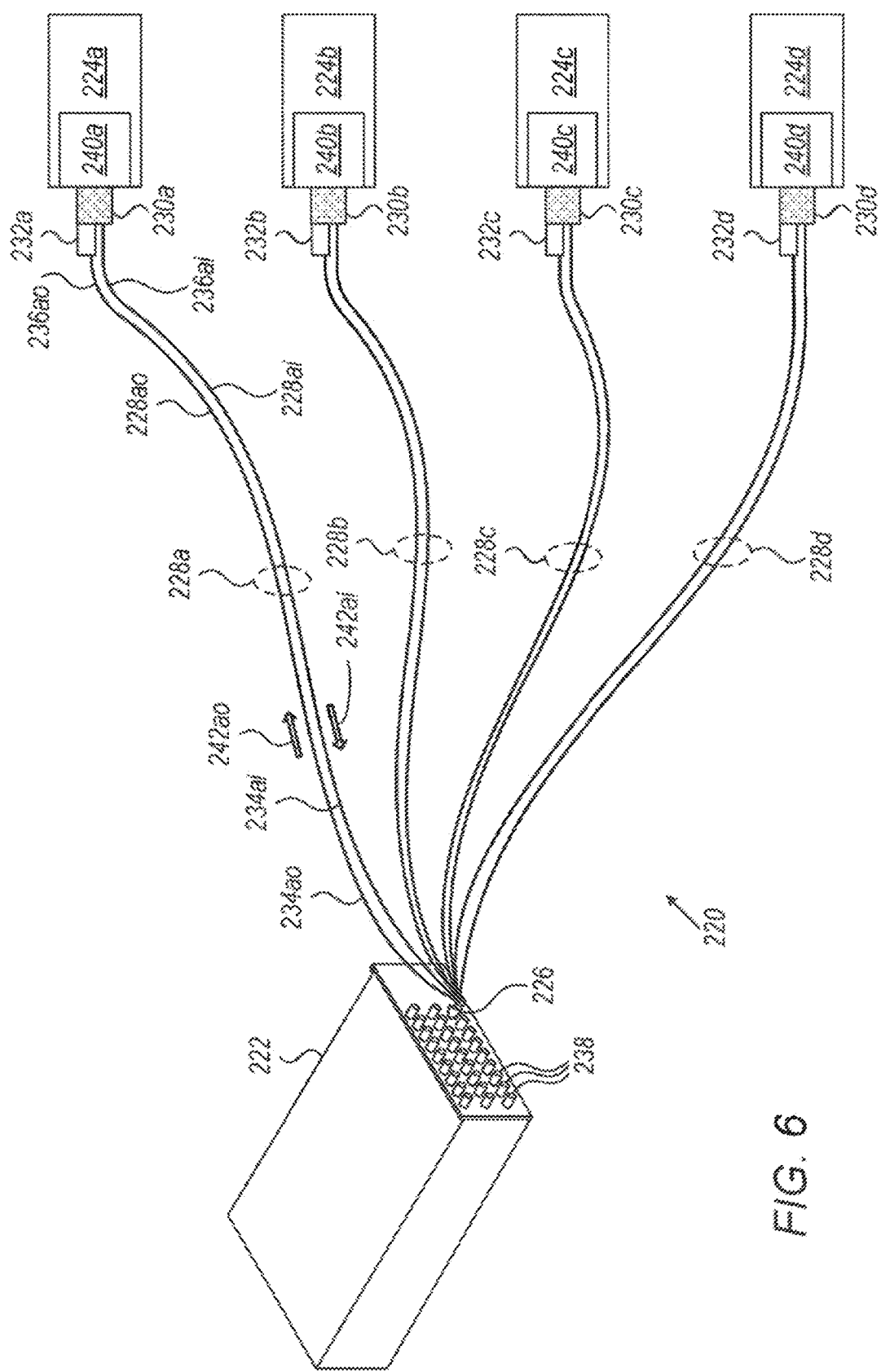
FIG. 6 is a schematic pictorial illustration of an active optical cable connecting a switch assembly to four servers, in accordance with yet another embodiment of the invention.

Active optical cable 20 comprises a single optical connector 26 (detailed further in FIG. 2), four optical fibers 28a, 28b, 28c, and 28d, four electrical connectors 30a, 30b, 30c, and 30d (detailed further in FIG. 3), and four wavelength selection optics 32a, 32b, 32c, and 32d. (In this simplified example, only one-way communication is described; but in practical applications, the active optical cable may comprise eight optical fibers for two-way four-channel communication, for example as is shown in FIG. 6). Each optical fiber 28a . . . 28d comprises a respective first end 34a, 34b, 34c, and 34d and a respective second end 36a, 34b, 34c, and 36d. First ends 34a . . . 34d are connected together to optical connector 26, and second ends 36a . . . 36d are connected to respective electrical connectors 30a . . . 30d via respective wavelength selection optics 32a . . . 32d, as detailed further in FIGS. 2 and 3.

Switch assembly 22 comprises many optical receptacles 38, for example 128 receptacles arranged in a rectangular 8×16 matrix. The number of optical receptacles, as well as their arrangement in a matrix form, are used as an example only.

Each server 24a . . . 24d comprises a respective electrical receptacle 40a, 40b, 40c, and 40d.

Cable 20 (and similarly the other active optical cables described below) and connectors 26 and 30a . . . 30d may be designed to comply with any applicable standard, for example Ethernet and InfiniBand standards, such as Ethernet variants 200GBASE-FR4, 400GBASE-FR4, and 100GBASE-LR4 to support four wavelengths. In this context optical connector 26 may be of type LC or FC for a 1-4 fiber split as shown in the present figures, or possibly of type MPO for larger split ratios. Electrical connectors 30a . . . 30d may comprise small form-factor pluggable (SFP) modules, such as type SFP or SFP+ to carry a single lane of traffic or type QSFP, QSFP-DD, or OSFP for multiple lanes. Transceivers as described herein may also comprise SFP modules, such as type SFP or SFP+ to carry a single lane of traffic or type QSFP, QSFP-DD, or OSFP for multiple lanes. These specific types and standards are listed here only by way of example, and not limitation.

Figure 2:
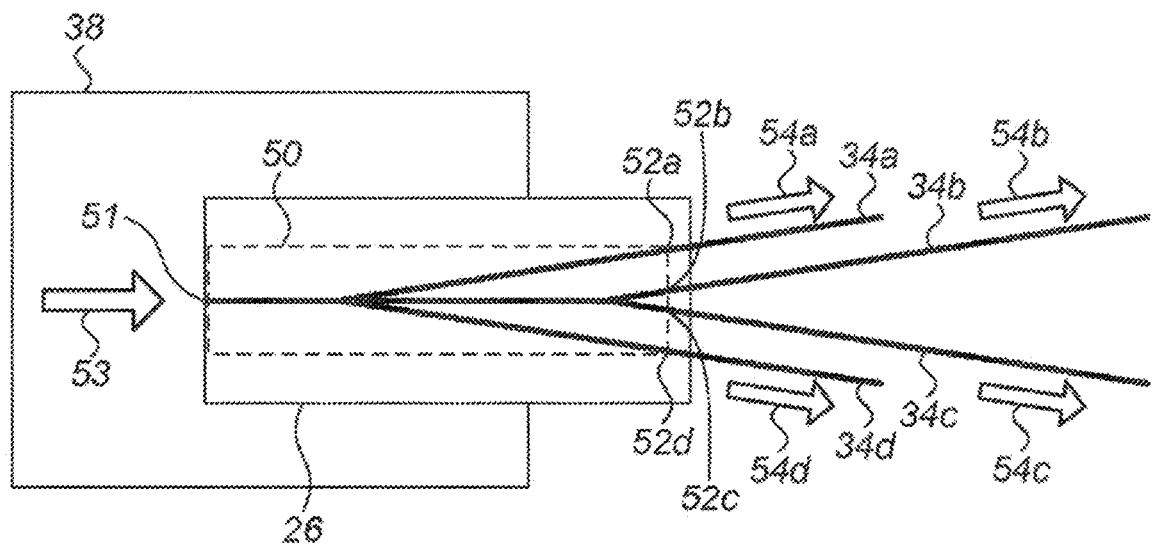
FIG. 2 is a schematic detail view of an optical connector connected to an optical receptacle and optical fibers, for use in the embodiment of FIG. 1.

FIG. 2 is a schematic detail illustration of optical connector 26 connected to optical receptacle 38 and optical fibers 28a . . . 28d, in accordance with an embodiment of the invention.

Optical connector 26 comprises a 1-to-4 optical splitter 50, which comprises, for example, a waveguide splitter, as is known in the art. Optical splitter 50 comprises an input 51 and four outputs 52a, 52b, 52c, and 52d. With reference to FIG. 1, first ends 34a . . . 34d of optical fibers 28a . . . 28d are connected to the respective outputs 52a . . . 52d. Optical connector 26 is inserted into optical receptacle 38, from which the connector receives an optical input signal 53 comprising four wavelengths $\lambda_1, \lambda_2, \lambda_3$, and $\lambda_4$. Splitter 50 divides optical input signal 53 into four optical signals 54a, 54b, 54c, and 54d, which propagate through respective outputs 52a . . . 52d into respective first ends 34a . . . 34d and further, with reference to FIG. 1, within optical fibers 28a . . . 28d. Each optical signal 54a . . . 54d comprises all four wavelengths $\lambda_1 . . . \lambda_4$.

Figure 3:
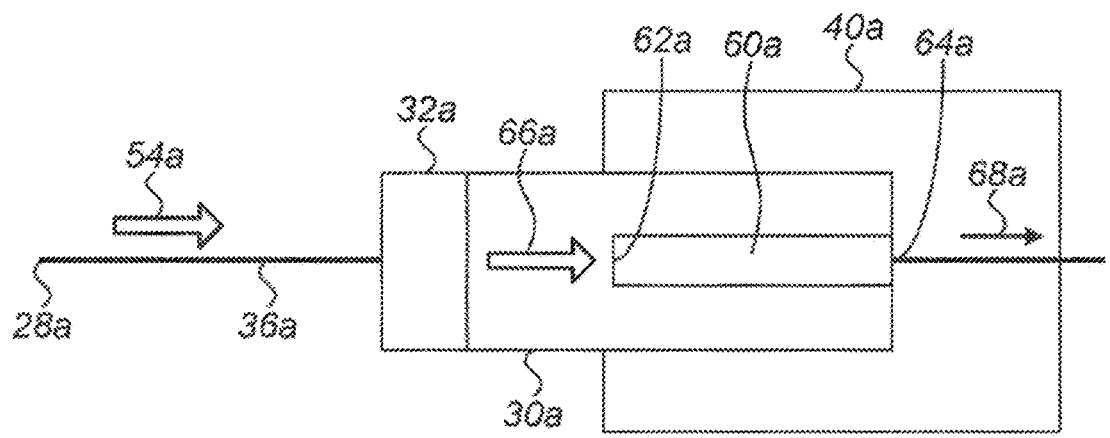
FIG. 3 is a schematic detail view of an electrical connector connected to an electrical receptacle and an optical fiber via wavelength selection optics, for use in the embodiment of FIG. 1.

FIG. 3 is a schematic detail illustration of an electrical connector 30a connected to an electrical receptacle 40a and optical fiber 28a via wavelength selection optics 32a, in accordance with an embodiment of the invention. Electrical connectors 30b . . . 30d are similar in structure to connector 30a, together with their connections to respective fibers 28b . . . 28d. While the electrical connector 30a of FIG. 3 is illustrated as comprising a transceiver 60a and being connected to an electrical receptacle 40a, it should be appreciated that in some embodiments, an electrical connector 30a may be removably connected to a transceiver 60a which may be used to connect the electrical connector 30a to the electrical receptacle 40a. In this way, a technician installing a cable may route the cable without having to snake a bulky transceiver 60a through a small space and can instead connect the electrical connector 30a of the cable to a transceiver 60a at the node after routing the cable.

Electrical connector 30a may comprise or be connected to a transceiver 60a, comprising an optical input 62a and an electrical output 64a, such that an optical signal received at the optical input is converted to an electrical signal at the output. Transceiver 60a (as well as transceivers 60b . . . 60d, not shown in the Figure) is generally selected to comply with one of the Ethernet standards described above. With reference to FIG. 1, wavelength selection optics 32a are connected to electrical connector 30a, and second end 36a of optical fiber 28a is connected to the wavelength selection optics. Wavelength selection optics 32a comprise, for example, an optical bandpass filter. Electrical connector 30a is inserted into electrical receptacle 40a or is inserted into the transceiver 60a which is inserted into the electrical receptacle 40a.

Optical signal 54a impinges on wavelength selection optics 32, which transmits only one of the four wavelengths $\lambda_1 . . . \lambda_4$, for example $\lambda_1$. Thus, input 62a receives an optical signal 66a that comprises only wavelength $\lambda_1$, and signal 54a with four wavelengths and a data rate of 400 Gb/s (4×100 Gb/s), has been reduced to signal 66a with one wavelength ($\lambda_1$) and a data rate of 100 Gb/s. This 100 Gb/s signal is converted by transceiver 60a into an electrical signal 68a, which exits from electrical output 64a to receptacle 40a.

By configuring the optical passbands of wavelength selecting optics 32a . . . 32d such that each wavelength selecting optics transmits a different, respective one of the four wavelengths $\lambda_1 . . . \lambda_4$, the four 100 Gb/s optical signals carried as 4×100 Gb/s within optical fibers 28a . . . 28d are demultiplexed to the four servers 24a . . . 24d.

Although wavelength selection optics 32a is shown in FIGS. 1 and 3 to be positioned adjacent to electrical connector 30a, they may alternatively be positioned at other locations within optical fiber 28a. For example, wavelength selection optics 32a may be positioned in optical fiber 28a part way between optical connector 26 and electrical connector 30a, such that the part of optical fiber 28 a downstream from the wavelength selection optics already carries a 100 Gb/s signal at a single wavelength. Second end 36a is in such a case connected directly to electrical connector 30a.

Second Embodiment

Figure 4:
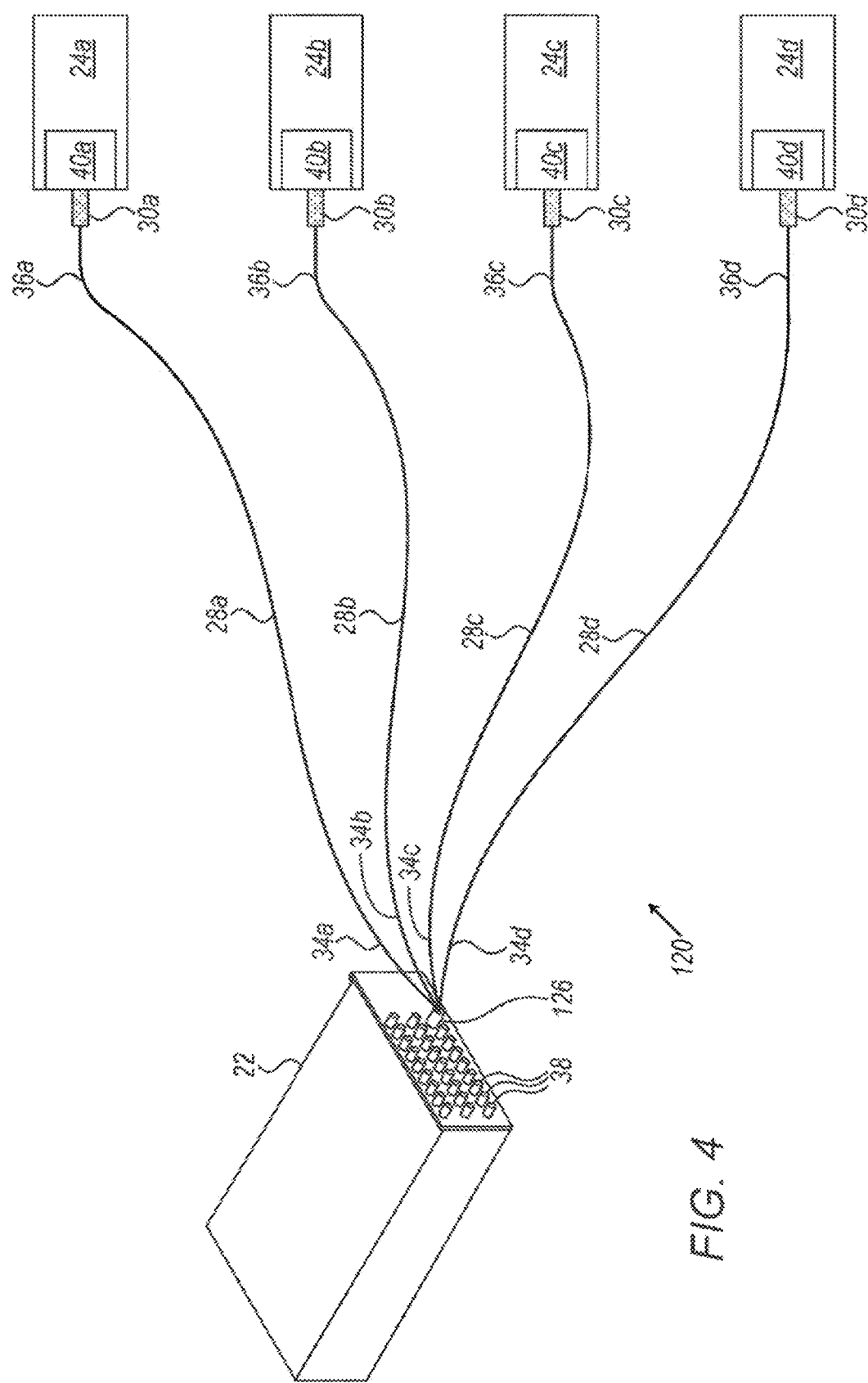
FIG. 4 is a schematic pictorial illustration of an active optical cable connecting a switch assembly to four servers, in accordance with another embodiment of the invention.

FIG. 4 is a schematic pictorial illustration of an active optical cable 120 connecting switch assembly 22 to four servers 24a, 24b, 24c, and 24d, in accordance with another embodiment of the invention.

Active optical cable 120 comprises a single optical connector 126 (detailed further in FIG. 5), and, similar to active optical cable 20 in FIG. 1, four optical fibers 28a . . . 28d, and four electrical connectors 30a . . . 30d. Active optical cable 120 differs from active optical cable 20 in that wavelength selection takes place within optical connector 126, and therefore wavelength selection optics 32a . . . 32d have been omitted from FIG. 4. Due to the similarity to FIG. 1, the same indicator numbers are used to refer to related items.

Figure 5:
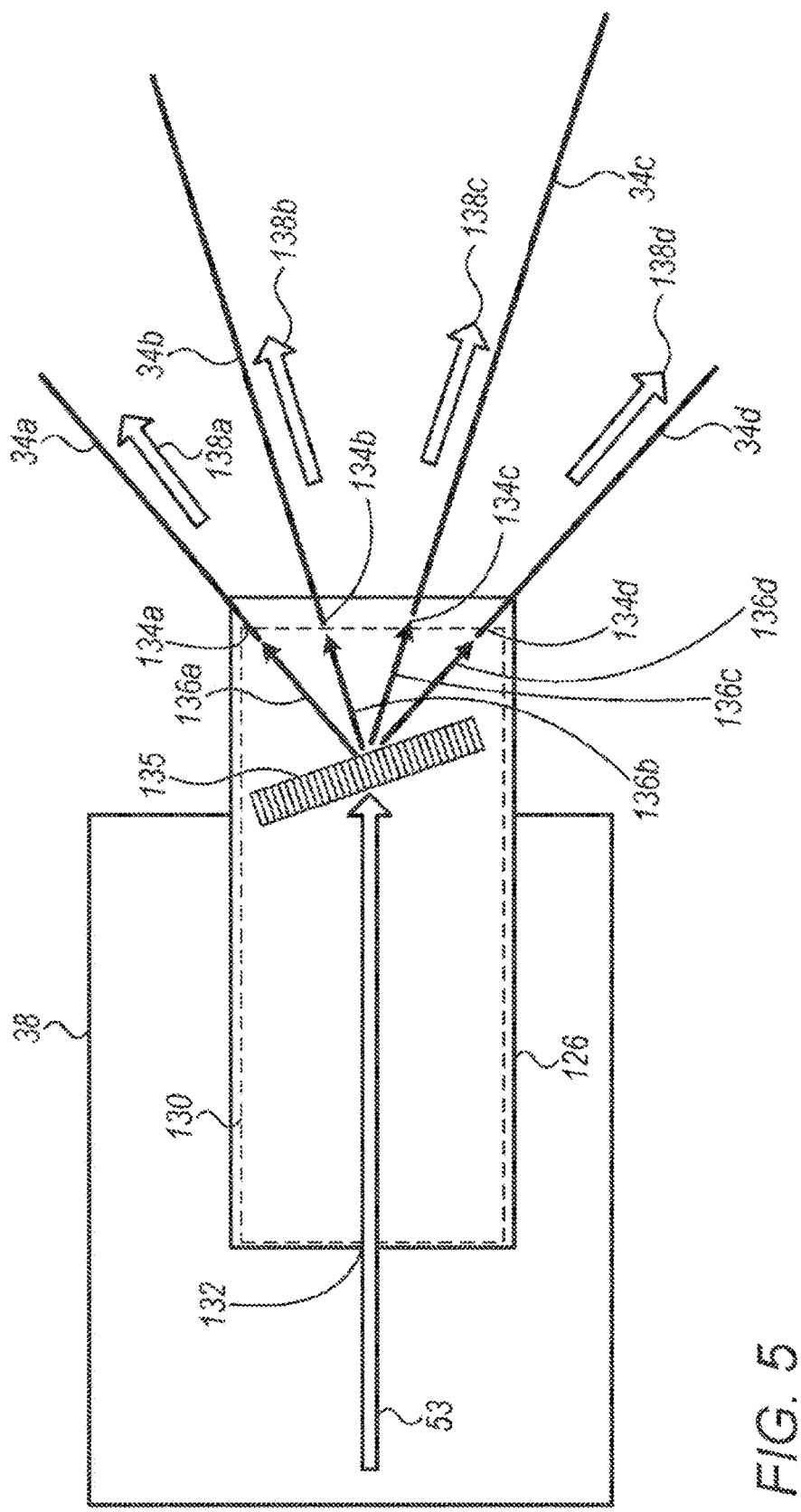
FIG. 5 is a schematic detail view of an optical connector connected to an optical receptacle and optical fibers, For use in the embodiment of FIG. 4.

FIG. 5 is a schematic detail illustration of optical connector 126 connected to optical receptacle 38 and to optical fibers 28a . . . 28d, in accordance with the embodiment of FIG. 4.

Optical connector 126 comprises wavelength selection optics 130, for example a transmission diffraction grating 135 functioning as a wavelength-division demultiplexer (a wavelength splitter). Alternatively, other sorts of wavelength splitters and filters may be used for this purpose, as are known in the art. Wavelength selection optics 130 comprise an input 132 and four outputs 134a, 134b, 134c, and 134d. With reference to FIG. 4, first ends 34a . . . 34d of optical fibers 28a . . . 28d are connected to the respective outputs 134a . . . 134d. Optical connector 126 is inserted into optical receptacle 38, from which the connector receives, similar to FIG. 2, an optical input signal 53 comprising four wavelengths $\lambda_1$ . . . $\lambda_4$.

Wavelength selection optics 130 divide optical input signal 53 into four optical signals 136a, 136b, 136c, and 1364d, which propagate through respective outputs 134a . . . 134d into respective first ends 34a . . . 34d as optical signals 138a, 138b, 138c, and 138d. As opposed to the embodiment depicted in FIGS. 1 and 2, however, due to the dispersive action of wavelength-division demultiplexer in selection optics 130, each one of optical signals 136a . . . 136d comprises only one of the four wavelengths $\lambda_1$ . . . $\lambda_4$ (with each optical signal comprising a different wavelength from the others). Thus, each one of optical signals 138a . . . 138d, with reference to FIG. 4, in respective optical fibers 28a . . . 28d comprises an optical signal at a respective one of wavelengths $\lambda_1$ . . . $\lambda_4$ and at a data rate of 100 Gb/s. Second ends 36a . . . 36d of optical fibers 28a . . . 28d may be connected directly to respective electrical connectors 30a . . . 30d.

Bidirectional Communications

FIG. 6 is a schematic pictorial illustration of an active optical cable 220 connecting a switch assembly 222 to four servers 224a, 224b, 224c, and 224d, in accordance with yet another embodiment of the invention.

Active optical cable 220 comprises a single optical connector 226 (detailed further in FIG. 7), four optical fiber pairs 228a, 228b, 228c, and 228d, four electrical connectors 230a, 230b, 230c, and 230d (detailed further in FIG. 8), and four wavelength selection optics 232a, 232b, 232c, and 232d. For the sake of simplicity, the details of optical fiber pairs 228a . . . 228d are shown only for pair 228a, as these details are the same for pairs 228b . . . 228d. Fiber pair 228a comprises a fiber 228ao and a fiber 228ai, wherein "o" denotes that fiber 228ao conveys an optical signal out from switch assembly 222, and "i" denotes that fiber 228ai conveys an optical signal into the switch assembly. The optical signals conveyed out of and into switch assembly 222 are schematically represented by arrows 242ao and 242ai, respectively. Fiber 228ao comprises a first end 234ao and a second end 236ao, and fiber 228ai comprises a first end 234ai and a second end 236ai, with the notations "o" and "i" defined above.

Figure 7:
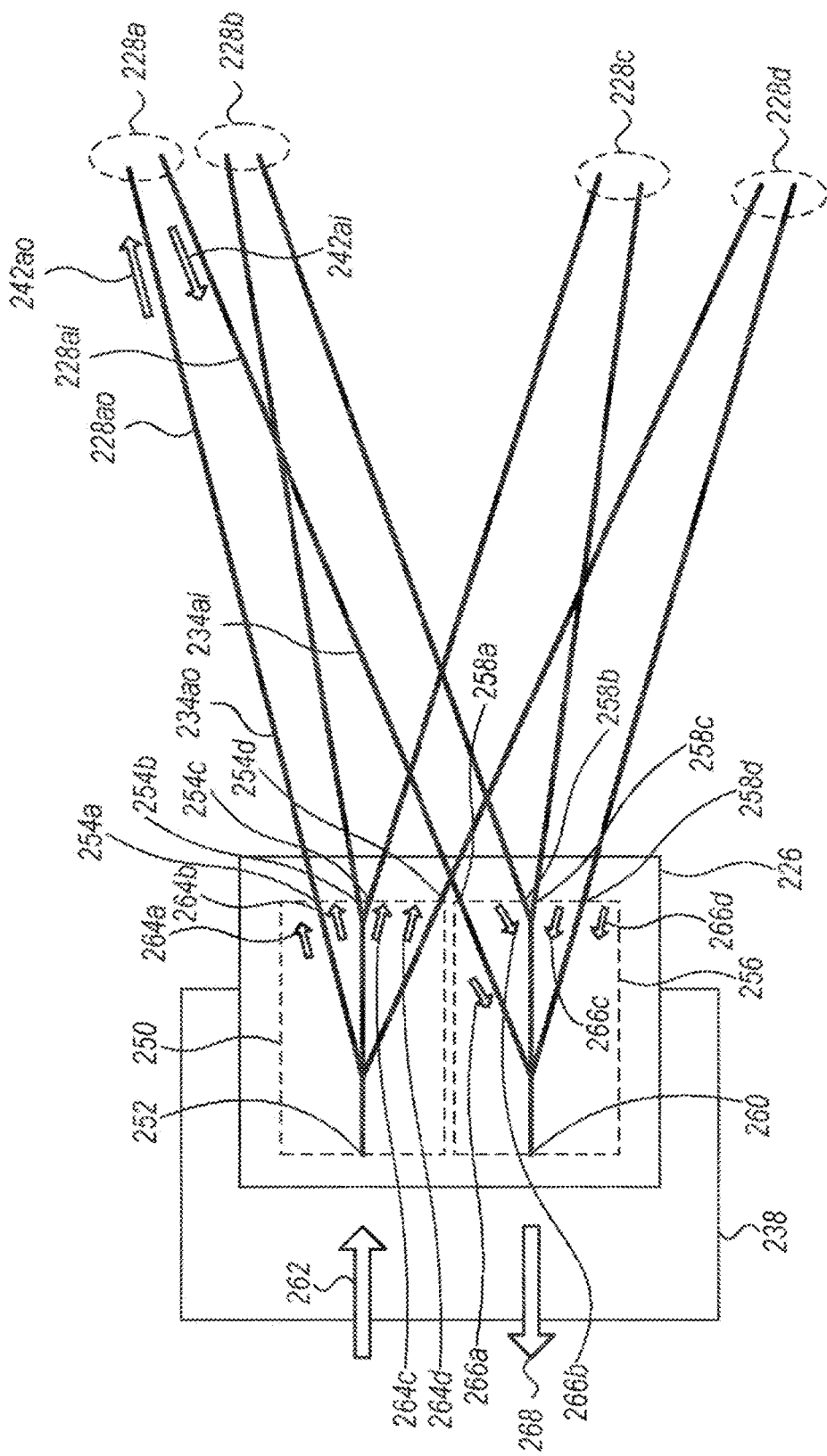
FIG. 7 is a schematic detail view of an optical connector connected to an optical receptacle and optical fiber pairs, for use in the embodiment of FIG. 6.
Figure 8:
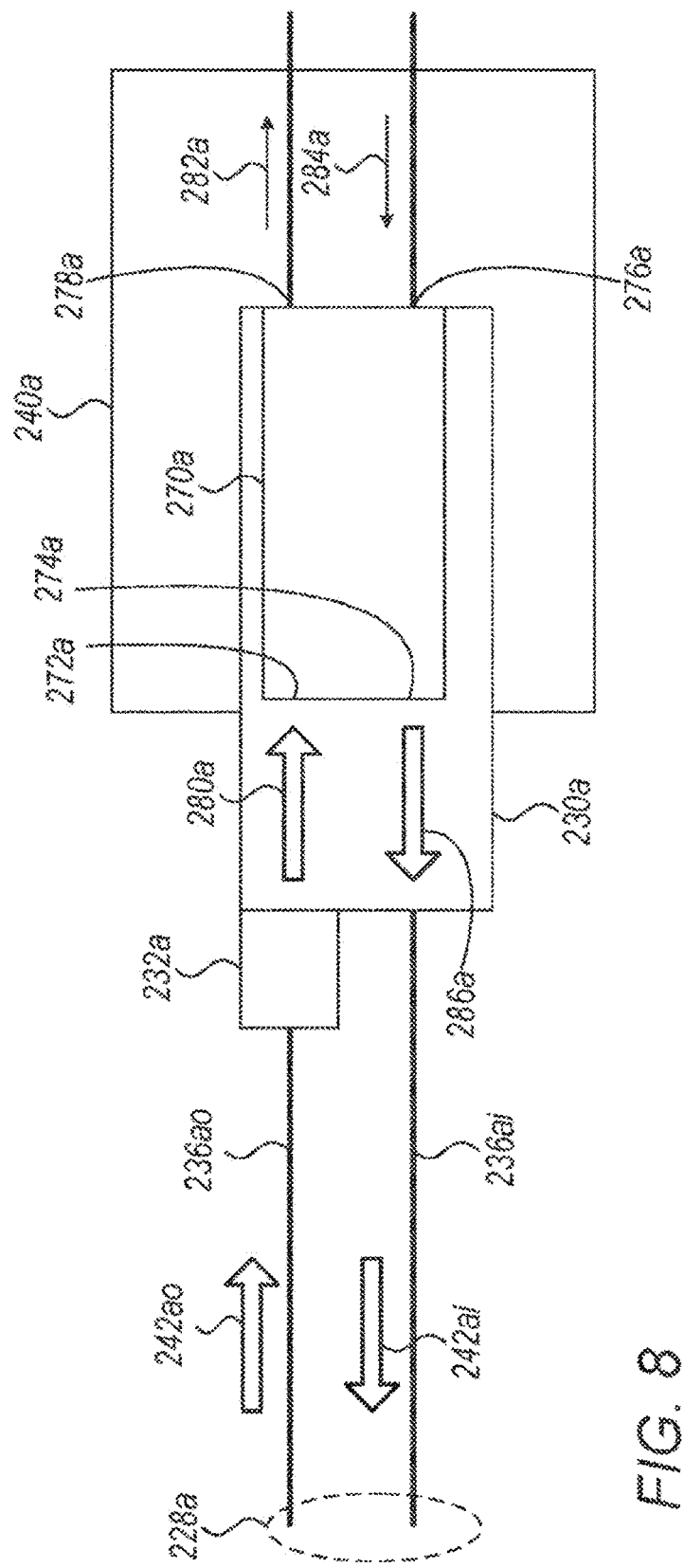
FIG. 8 is a schematic detail view of an electrical connector connected to an electrical receptacle and to second ends of an optical fiber pair, for use in the embodiment of FIG. 6.

First ends 234ao and 234ai of optical fiber pair 234a are connected to optical connector 226, and second ends 236ao and 236ai of optical fiber pair 234a are connected to electrical connector 230a, as detailed further in FIGS. 7 and 8. Similar connections are made for optical fiber pairs 234b . . . 234d, but the details are again omitted here for the sake of clarity.

Similar to switch assembly 22 in FIGS. 1 and 4, switch assembly 222 comprises a matrix of optical receptacles 238. Each server 224a . . . 224d comprises respective electrical receptacles 240a, 240b, 240c, and 240d.

FIG. 7 is a detail schematic illustration of optical connector 226 connected to optical receptacle 238 and optical fiber pairs 228a . . . 228d, in accordance with the embodiment of FIG. 6. As in FIG. 6, details are described only for fiber pair 228a, while it is understood that similar descriptions apply also to fiber pairs 228b . . . 228d.

Optical connector 226 comprises a 1-to-4 optical splitter 250 and a 4-to-1 optical joiner 256, which comprise, for example, two waveguide splitters configured to work in opposite directions. Optical splitter 250 comprises an input 252 and four outputs 254a, 254b, 254c, and 254d. Optical joiner 256 comprises four inputs 258a, 258b, 258c, and 258d, and one output 260.

With reference to FIG. 6, first ends 234ao and 234ai of optical fiber 228a are connected to output 254a and input 258a, respectively. Optical connector 226 is inserted into optical receptacle 238, from which the connector receives a 4×100 Gb/s optical input signal 262 comprising four wavelengths $\lambda_1$ . . . $\lambda_4$. Splitter 250 divides optical input signal 262 into four optical signals 264a, 264b, 264c, and 264d, wherein each of the four signals comprises all four wavelengths $\lambda_1$ . . . $\lambda_4$ i.e., a 4×100 Gb/s signal. Signal 264a propagates through output 254a to couple into first end 234ao and propagates in fiber 228ao as optical signal 242ao. Signals 264b . . . 264d are similarly coupled to respective fibers of fiber pairs 228b . . . 228d.

Signal 242ai, which, with reference to FIG. 8, is generated in electrical connector 230a, propagates in fiber 228ai into first end 234ai, from which it is coupled into input 258a, and propagates in joiner 256 as a signal 266a. Similarly, signals 266b . . . 266d arrive from respective fibers of fiber pairs 228b . . . 228d. Signals 266a . . . 266d are joined by joiner 256 into output optical signal 268, which further propagates into optical receptacle 238 of switch assembly 222.

Alternatively, optical splitter 250 may be implemented using wavelength selection optics 130 as shown in FIG. 5, in which case each of the four outgoing fiber of pairs 228a . . . 228d conveys a 100 Gb/s signal at a single wavelength. In this case, wavelength selection optics 232a . . . 232d may be omitted.

FIG. 8 is a schematic detail illustration of electrical connector 230a connected to electrical receptacle 240a and to second ends 236ao and 236ai of optical fiber pair 228a, in accordance with the embodiment of FIG. 6. Electrical connectors 230b . . . 230d and their connections to optical fiber pairs 228b . . . 228d are similar to connector 230a but are not detailed here for the sake of brevity.

In some embodiments, electrical connector 230a comprises a two-way transceiver 270a. In other embodiments, electrical connector 230a is removably connected to a transceiver 270a. Transceiver 270a comprises an optical input 272a, an optical output 274a, an electrical input 276a, and an electrical output 278a. An optical signal impinging on optical input 272a is converted by transceiver 270a into an electrical signal emitted at electrical output 278a, and an electrical signal inserted in electrical input 276a is converted by the transceiver into an optical signal, which is emitted at optical output 274a. With reference to FIG. 6, wavelength selection optics 232a are connected to electrical connector 230a, and second end 236ao is connected to the wavelength selection optics. Electrical connector 230a is inserted into receptacle 240a of server 224a.

Optical signal 242ao, carrying the four wavelengths $\lambda_1$ . . . $\lambda_4$ at a data rate of 4×100 Gb/s, enters electrical connector 230a via wavelength selection optics 232a. Wavelength selection optics 232a transmit only one of the four wavelengths, for example $\lambda_1$, into a signal 280a, which enters transceiver 270a via optical input 272a. Similar to the embodiments illustrated in FIGS. 1 and 3, due to the filtering action of wavelength selection optics 232a, signal 280a carries a signal at a data rate of 100 Gb/s, which is converted by transceiver 270a into an electrical signal 282a, and subsequently emitted from electrical output 278a into receptacle 240a.

An electrical signal 284a emitted from server 224a through receptacle 240a enters into transceiver 270a via electrical input 276a. Transceiver 270a converts electrical signal 284a into an optical signal 286a, which is emitted by optical output 274a into second end 236ai, and subsequently propagates, with reference to FIG. 6, in fiber 228ai as optical signal 242ai. Optical signal 286a is generally emitted at the same wavelength $\lambda_1$ as optical signal 280a. Alternatively, optical signal 286a may be emitted at a wavelength $\lambda_1'$ that is different from $\lambda_1$, as long as $\lambda_1'$ is also different from the wavelengths of the respective optical signals emitted by transceivers 270b . . . 270d of optical connectors 230b . . . 230d. This difference between the wavelengths emitted by the four transceivers enables the switch to distinguish between the signals received from the different transceivers.

The optical signals emitted by transceivers 270a . . . 270d, which are, with reference to FIG. 7, subsequently received by joiner 256 via inputs 258a . . . 258d as signals 266a . . . 266d and emitted as optical signal 268, are at different wavelengths so as to be differentiable by switching assembly 222.

To save power associated with operating a switch, it is desirable to co-package the switch with "optical engines" (small, high density optical transceivers sitting inside the switch ASIC package). Space constraints require the optical connectivity to use WDM—i.e., to carry at least four 100 Gb/s inputs or outputs respectively in each optical fiber to limit the number of optical fibers to such a co-packaged switch. This means that each fiber and each front panel optical connector carries e.g., 4×100 Gb/s.

In a switch-to-server application a single 400 Gb/s connection may overwhelm the server. It is desirable to split the connection into a plurality of independent connections, each of which can go to separate servers. This implies that each of the servers may receive a different wavelength from the switch and will be required to respond on the same wavelength.

It is possible to detect wavelength in a server-side transceiver and have a wavelength-tunable laser in the output of this transceiver. However, such a solution is excessively costly. This present disclosure offers a cost-efficient alternative.

A cable system may be implemented which use transceivers which are permanently connected to optical fiber to function as a connector system for connecting the fiber to a node such as a server. However, such an implementation would require the user to manage that four transceivers which any given fiber harness is connected to has exactly one of each of four wavelengths. This is a significant installation and inventory burden on the user, requiring transceivers of different wavelengths.

The present disclosure allows the interface between fiber and transceiver to be detachable. This greatly simplifies installation, since it can be cumbersome to drag a bulky transceiver through cable trays in the datacenter The present disclosure solves this problem, by introducing a mechanical key to the optical connectors of the fiber and the server-end transceivers, securing that only matching fiber and transceiver pairs can be connected.

Figure 9:
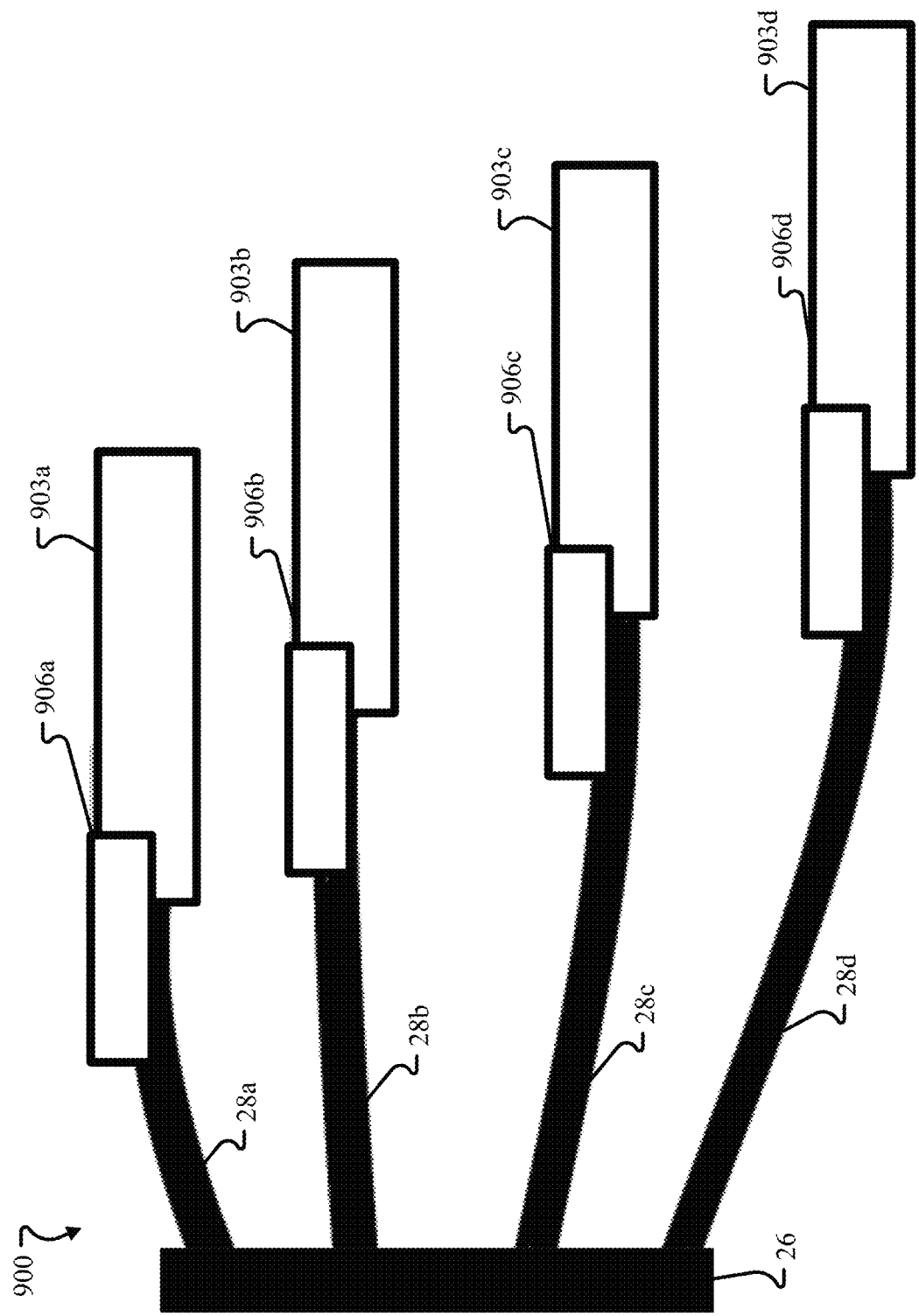
FIG. 9 is an illustration of an optical connector connected to four transceivers in accordance with one or more of the embodiments described herein.

As illustrated in FIG. 9, an optical cable 900 may connect an optical connector 26, as described in FIG. 2, to a plurality of transceivers 903a-903d.

A transceiver as described herein may be one or more of a 100G SR4 transceiver, a 50G SR 4 transceiver, a 40B/ 100G SR4 transceiver, a 10G/25G SR transceiver, or other type of transceiver. Each transceiver may be configured to operate on a different wavelength as needed for particular applications. Each of the transceivers may be configured to emit an optical signal at the same wavelength as the signal it received. Alternatively, each of the transceivers may emit at another wavelength, as long as each wavelength is emitted by only one of the transceivers, so that the hub is able to distinguish between the signals from the different transceivers.

The optical connector 26 of the cable 900 is connected to a plurality of electrical connectors 906a-906d via optical fibers 28a-28d. The optical connector 26 may be a single connector which is capable of being inserted into a receptacle of a device such as a switch or other type of network hub and of receiving a plurality of signals from the device via the receptacle. The electrical connectors 906a-906d may each be configured to receive a signal from the optical connector 26 via the optical fibers 28a-28d. Each signal may be of a particular wavelength as described herein. Each wavelength received by each electrical connector 906-906d may be a different wavelength.

In some embodiments, the electrical connectors 906a-906d may be one or more of an MPO, a duplex LC optical channel, or other form of connector. In certain embodiments, the electrical connectors 906a-906d are single-channel connectors designed to pass a signal from an optical fiber cable to a node.

Electrical connectors 906a-906d of the optical cable 900 may each be configured to mate with a respective transceiver 903a-903d. In some embodiments, the electrical connectors 906a-906d may each be of a particular such that each can mate with only a certain respective transceiver 903a-903d.

Figure 10:
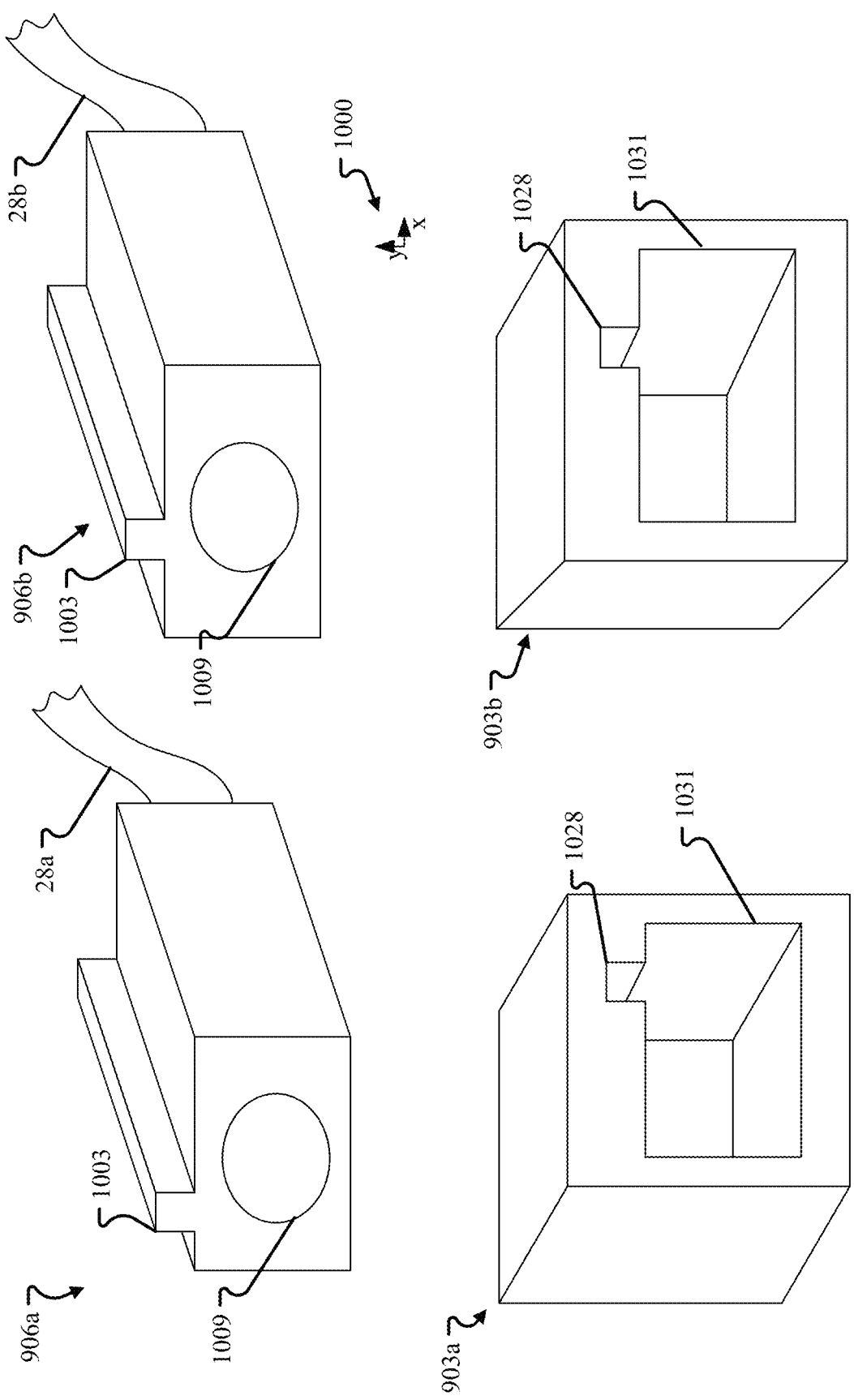
FIG. 10 is an illustration of two connectors and two mating transceivers in accordance with one or more of the embodiments described herein.

For example, as illustrated in FIG. 10, each electrical connector 906a, 906b may be connected to an optical fiber 28a which may be connected to a terminal 1009 at one end of the respective connector 906a, 906b. Each connector 906a, 906b may be designed to be inserted into an opening of a transceiver 903a, 903b.

Each electrical connector 906a, 906b may comprise a keyed portion 1003 extruding from one edge. The keyed portion 1003 may be a portion of a housing of the connector 906a-906d. The housing may be made of a plastic material. The keyed portion 1003 may be a piece of the housing material which is a protrusion extruding from an upper portion of the connector 906a-906d. The keyed portion 1003 may be a particular distance from a left edge of the connector 906a and a particular distance from a right edge of the connector 906a. It should be appreciated other shapes and sizes of keyed portions may be used. In this way, a single cable may comprise plurality of connectors 906a-d each of which including a different keyed portion 1003.

The keyed portion 1003 of a connector 906a may be designed match a recessed portion 1028 in an opening 1031 of a respective transceiver 903a. The keyed portion 1003 and matching recessed portion 1028 may be a particular distance along an x-axis 1000 from an edge of the connector 906a and transceiver 903a, respectively.

A first connector 906a may be designed to mate only with a first transceiver 903a and a second connector 906b may be designed to mate only with a second transceiver 903b based on placement of the keyed portion 1003 of each connector 906a and matching recessed portion 1028 of each transceiver 903a.

The matching transceiver 903a-d of each connector 906a-d may be designed to receive and convey the particular wavelength of the signal being output by each connector 906*a-d*. For example, wavelength selection optics as described herein may be used to send a first signal at a first wavelength to a first connector 906*a* and a second signal at a second wavelength to a second connector 906*b*. The first connector 906*a* may mate with a first transceiver 903*a* and the second connector 906*b* may mate with a second transceiver 903*b*. The first transceiver 903*a* may be designed to receive and convey the first signal only at the first wavelength and the second transceiver 903*b* may be designed to receive and convey the second signal only at the second wavelength. Similarly, each of four or more connectors 906*a-d* may receive a different signal at a different wavelength. Each of the connectors 906*a*-906*d* may connect and mate with a different one of transceivers 903*a-d*. Each of the transceivers 903*a-d* may be designed to receive and convey signals of particular wavelengths to match the signals of the connectors 906*a-d*. Wavelength selection optics as described herein may comprise, for example, one or more of a wavelength splitter and an optical wavelength-division demultiplexer, a transmission diffraction grating, a wavelength selection filter, an optical wavelength-division demultiplexer.

Using such a cable, a technician setting up a switch may be enabled to route cables with keyed connectors to nodes and to then select a transceiver which matches the keyed connector. Such a technician can be assured that the wavelength transceiver matches that of the cable.

Figure 11:
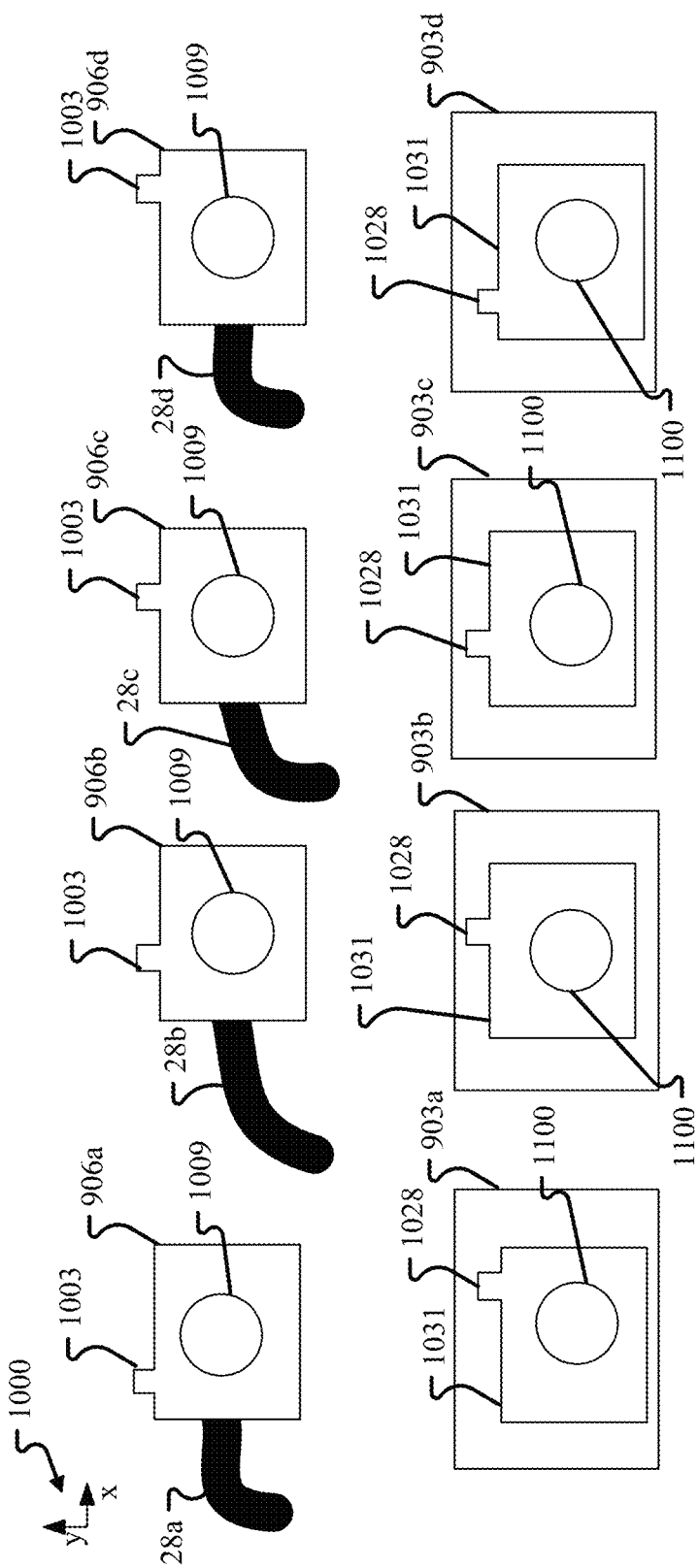
FIG. 11 is an illustration of four connectors and four mating transceivers in accordance with one or more of the embodiments described herein.

FIG. 11 illustrates a plurality of electrical connectors 906*a*-906*d* and transceivers 903*a-d*. Each connector 906*a-d* is keyed with a keyed portion 1003 in a different position to match a recessed portion 1028 of a respective transceiver 903*a-d*.

The keyed portion 1003 of each receiver may be a particular distance along an x-axis 1000 to match with a recessed portion 1028 of a respective transceiver 903*a-d*. Each connector 906*a-d* may be connected to a respective optical fiber 28*a-d*. The optical fiber 28*a-d* connected to each connector 906*a-d* may be electrically connected to a contact 1009.

Each connector 906*a-d* mates to a different one of a plurality of transceivers 903*a-d* based on placement of a recessed portion 1028 to match the keyed portion 1003. The electrical connector 906*a-d* may be shaped to fit into an opening 1031 of a particular transceiver 903*a-d* based on the placement of the keyed portion 1003. Once inserted, the contact 1009 of the connector 906*a-d* meets a contact 1100 of the transceiver 903*a-d*.

Figure 12:
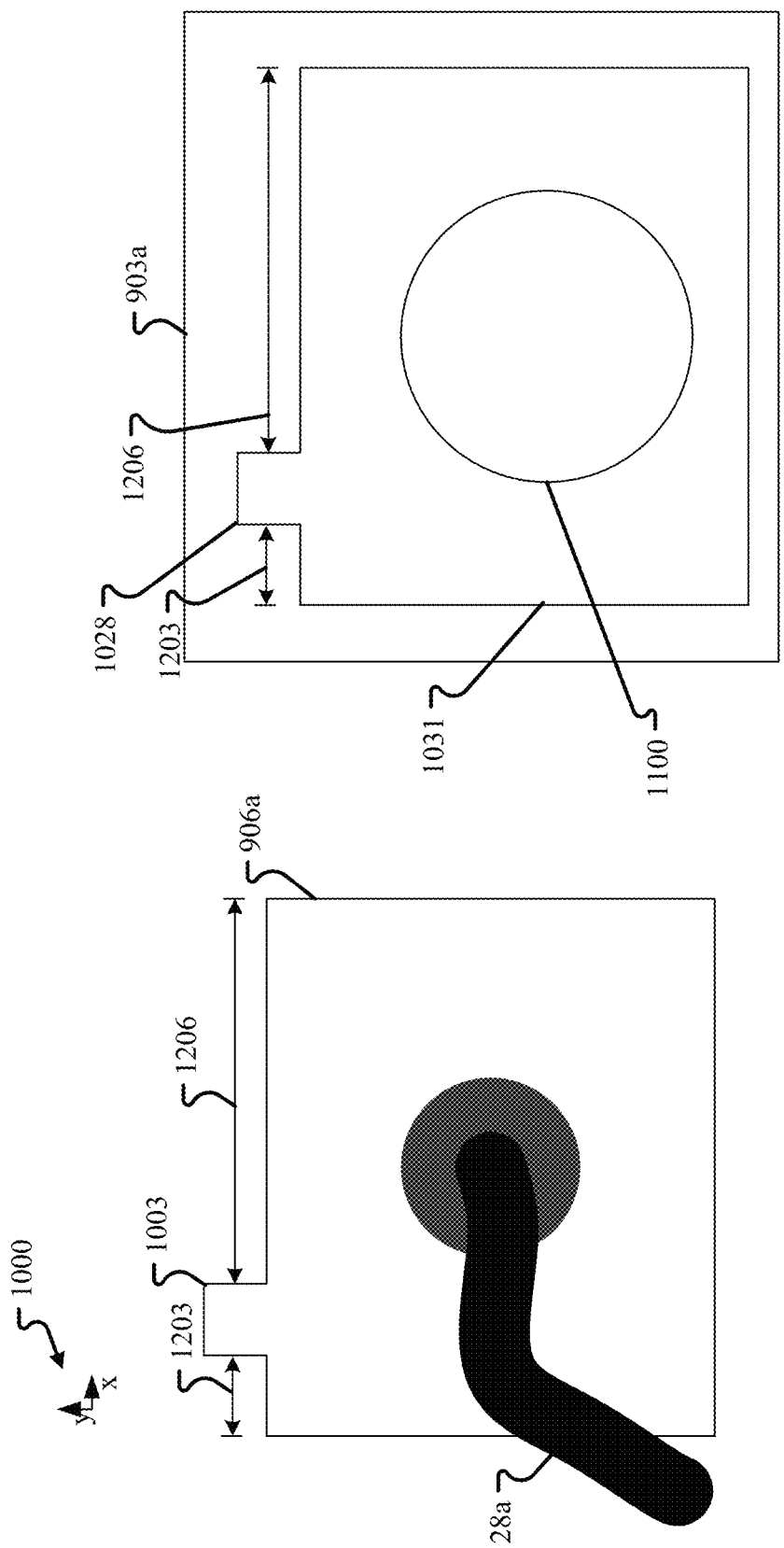
FIG. 12 is an illustration of a connector and a mating transceiver in accordance with one or more of the embodiments described herein.

As illustrated in FIG. 12, a keyed portion 1003 of a connector 906*a* may be a first distance 1203 from a first side of the connector 906*a* and a second distance 1206 from a second side of the connector 906*a*. Similarly, the matching transceiver 903*a* with which the connector 906*a* is configured to mate includes a recess portion 1028 the same first distance 1203 from a first side of the opening 1031 of the transceiver 903*a* and the same second distance 1206 from a second side of the opening 1031 of the transceiver 903*a*.

Figure 13:
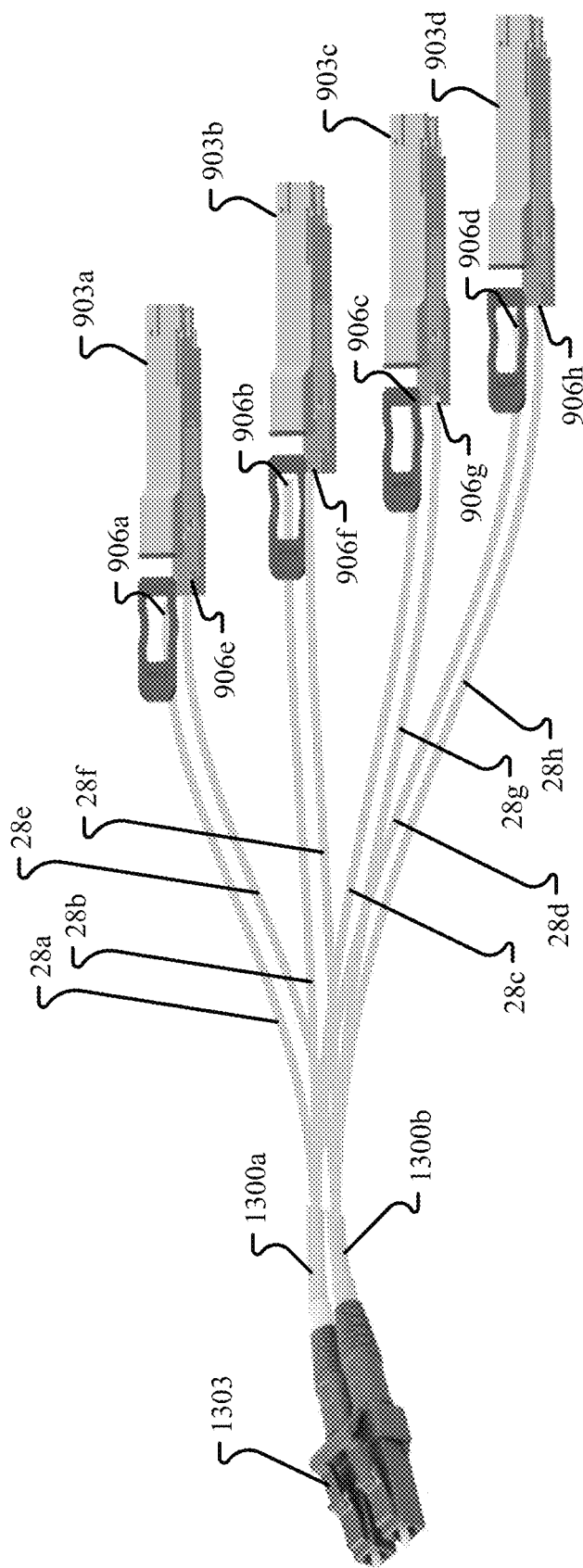
FIG. 13 is an illustration of an optical connector connected to four transceivers in accordance with one or more of the embodiments described herein.

As illustrated in FIG. 13, in some embodiments, a dual fiber connector 1303 may be connected to two groups 1300*a*, 1300*b* of optical fibers 28*a*-28*h*. Each group 1300*a*, 1300*b*, may comprise four optical fibers 28*a*-28*h*, each carrying a particular wavelength. Similar to as described above, in relation to FIG. 6, the dual fiber connector 1303 may be connected to four optical fiber pairs. Each optical fiber 28*a*-28*d* of the first group 1300*a* may connect to a different one of four transceivers 903*a-d*. Each optical fiber 28*e*-28*h* of the second group 1300*b* may connect to a different one of the four transceivers 903*a-d*. As such, each transceiver may connect to two of the optical fibers 28*a*-28*h*.

To aid a technician in setting up such a connection, each of the optical fibers 28*a*-28*h* may terminate with an electrical connector 906*a*-906*h* as described herein. Each of the electrical connectors 906*a*-906*h* may include a keyed portion such that the electrical connector 906*a*-906*h* may be connected only in a correct port of a correct transceiver.

In some embodiments, each port of each transceiver may include a distinct keyed portion which is designed to mate only with one electrical connector. Though it should be appreciated that in some embodiments two or more electrical connectors and two or more transceiver portions may have matching keyed portions such that certain cables may be swapped depending on application.

It will be appreciated that the embodiments described above are cited by way of example, and that the present invention is not limited to what has been particularly shown and described hereinabove. Rather, the scope of the present invention includes both combinations and sub combinations of the various features described hereinabove, as well as variations and modifications thereof which would occur to persons skilled in the art upon reading the foregoing description and which are not disclosed in the prior art.

Embodiments of the present disclosure include a cable comprising: a single connector configured for insertion into a first receptacle so as to receive a plurality of signals from the receptacle; a first connector of a plurality of connectors configured to receive a first signal of the plurality of signals, wherein the first signal is at a first wavelength, the first connector comprises a first keyed portion on a first surface of the first connector a first distance from a side of the first connector; a second connector of the plurality of connectors configured to receive a second signal of the plurality of signals, wherein the second signal is at a second wavelength, the second wavelength is different from the first wavelength, the second connector comprises a second keyed portion on a first surface of the second connector a second distance from a side of the second connector, and the first distance is different than the second distance; and a plurality of transmission lines, each transmission line having a respective first end connected to the single connector so as to receive a respective signal of the plurality of signals and each of the transmission lines having a respective second end coupled to a respective one of the plurality of connectors.

Aspects of the above cable include wherein the first keyed portion comprises a protrusion extending from the first surface.

Aspects of the above cable include wherein the first keyed portion is configured to mate with an indentation on a first transceiver, wherein the first transceiver is configured to receive the first signal at the first wavelength.

Aspects of the above cable include wherein the second keyed portion is configured to mate with an indentation on a second transceiver, wherein the second transceiver is configured to receive the second signal at the second wavelength.

Aspects of the above cable include the cable further comprising wavelength selection optics associated with the transmission lines so that the first transceiver receives and conveys the first signal only at the first wavelength and the second transceiver receives and conveys the second signal only at the second wavelength.

Aspects of the above cable include wherein the wavelength selection optics comprises one or more of a wavelength splitter and an optical wavelength-division demultiplexer, a transmission diffraction grating, a wavelength selection filter, an optical wavelength-division demultiplexer.

Aspects of the above cable include wherein the cable is an optical cable, the single connector is a single optical connector, the first receptacle is an optical receptacle, the plurality of signals is a plurality of optical signals, and the plurality of transmission lines is a plurality of optical transmission lines.

Aspects of the above cable include wherein each of the plurality of connectors are configured to detachably connector to a respective transceiver.

Aspects of the above cable include the cable further comprising a third connector of the plurality of connectors configured to receive a third signal of the plurality of signals, wherein the third signal is at a third wavelength, the third wavelength being different from the first and second wavelengths, the third connector comprising a third keyed portion on a first surface of the third connector a third distance from a side of the third connector, and the third distance being different from the first and second distances.

Aspects of the above cable include the cable further comprising a fourth connector of the plurality of connectors configured to receive a fourth signal of the plurality of signals, wherein the fourth signal is at a fourth wavelength, the fourth wavelength being different from the first, second, and third wavelengths, the fourth connector comprising a fourth keyed portion on a first surface of the fourth connector a fourth distance from a side of the fourth connector, and the fourth distance being different from the first, second, and third distances.

Embodiments include a method for networking, the method comprising: providing a cable comprising: a single connector configured for insertion into a first receptacle so as to receive a plurality of signals from the receptacle; a first connector of a plurality of connectors configured to receive a first signal of the plurality of signals, wherein the first signal is at a first wavelength, the first connector comprises a first keyed portion on a first surface of the first connector a first distance from a side of the first connector; a second connector of the plurality of connectors configured to receive a second signal of the plurality of signals, wherein the second signal is at a second wavelength, the second wavelength is different from the first wavelength, the second connector comprises a second keyed portion on a second surface of the second connector a second distance from a side of the second connector, and the first distance is different than the second distance; and a plurality of transmission lines, each transmission line having a respective first end connected to the single connector so as to receive a respective signal of the plurality of signals and each of the transmission lines having a respective second end coupled to a respective one of the plurality of connectors; inserting the single connector into a receptacle in a network hub; inserting the first connector into a first transceiver, wherein the first keyed portion mates with a keyed portion on the first transceiver; and inserting the second connector into a second transceiver, wherein the second keyed portion mates with a keyed portion on the second transceiver.

Aspects of the above method include wherein the first keyed portion comprises a protrusion extending from the first surface.

Aspects of the above method include wherein the first transceiver is configured to receive the first signal at the first wavelength.

Aspects of the above method include wherein the second transceiver is configured to receive the second signal at the second wavelength.

Aspects of the above method include wherein the cable further comprises wavelength selection optics associated with the transmission lines so that the first transceiver receives and conveys the first signal only at the first wavelength and the second transceiver receives and conveys the second signal only at the second wavelength.

Aspects of the above method include wherein the wavelength selection optics comprises one or more of a wavelength splitter and an optical wavelength-division demultiplexer, a transmission diffraction grating, a wavelength selection filter, an optical wavelength-division demultiplexer.

Aspects of the above method include wherein the cable is an optical cable, the single connector is a single optical connector, the first receptacle is an optical receptacle, the plurality of signals is a plurality of optical signals, and the plurality of transmission lines is a plurality of optical transmission lines.

Embodiments include a method for producing a cable, the method comprising: providing a single connector configured for insertion into a first receptacle so as to receive a plurality of signals from the receptacle; providing a first connector of a plurality of connectors configured to receive a first signal of the plurality of signals, wherein the first signal is at a first wavelength, the first connector comprises a first keyed portion on a first surface of the first connector a first distance from a side of the first connector; providing a second connector of the plurality of connectors configured to receive a second signal of the plurality of signals, wherein the second signal is at a second wavelength, the second wavelength is different from the first wavelength, the second connector comprises a second keyed portion on a second surface of the second connector a second distance from a side of the second connector, wherein the first distance is different than the second distance; and providing a plurality of transmission lines, each transmission line having a respective first end connected to the single connector so as to receive a respective signal of the plurality of signals and each of the transmission lines having a respective second end coupled to a respective one of the plurality of connectors.

Aspects of the above method include wherein the first keyed portion comprises a protrusion extending from the first surface.

Aspects of the above method include wherein the first keyed portion is configured to mate with an indentation on a first transceiver, wherein the first transceiver is configured to receive the first signal at the first wavelength.

The invention claimed is:

1. A cable comprising:
a single connector configured for insertion into a first receptacle so as to receive a plurality of signals from the receptacle;
a first connector of a plurality of connectors configured to receive a first signal of the plurality of signals, wherein the first signal is at a first wavelength, the first connector comprises a first keyed portion on a first surface of the first connector a first distance from a side of the first connector;
a second connector of the plurality of connectors configured to receive a second signal of the plurality of signals, wherein the second signal is at a second wavelength, the second wavelength is different from the first wavelength, the second connector comprises a second keyed portion on a first surface of the second connector a second distance from a side of the second connector, and the first distance is different than the second distance; and a plurality of transmission lines, each transmission line having a respective first end connected to the single connector so as to receive a respective signal of the plurality of signals and each of the transmission lines having a respective second end coupled to a respective one of the plurality of connectors.

2. The cable of claim 1, wherein the first keyed portion comprises a protrusion extending from the first surface.

3. The cable of claim 2, wherein the first keyed portion is configured to mate with an indentation on a first transceiver, wherein the first transceiver is configured to receive the first signal at the first wavelength.

4. The cable of claim 3, wherein the second keyed portion is configured to mate with an indentation on a second transceiver, wherein the second transceiver is configured to receive the second signal at the second wavelength.

5. The cable of claim 4, further comprising wavelength selection optics associated with the transmission lines so that the first transceiver receives and conveys the first signal only at the first wavelength and the second transceiver receives and conveys the second signal only at the second wavelength.

6. The cable of claim 5, wherein the wavelength selection optics comprises one or more of a wavelength splitter and an optical wavelength-division demultiplexer, a transmission diffraction grating, a wavelength selection filter, an optical wavelength-division demultiplexer.

7. The cable of claim 1, wherein the cable is an optical cable, the single connector is a single optical connector, the first receptacle is an optical receptacle, the plurality of signals is a plurality of optical signals, and the plurality of transmission lines is a plurality of optical transmission lines.

8. The cable of claim 1, wherein each of the plurality of connectors are configured to detachably connector to a respective transceiver.

9. The cable of claim 1, further comprising a third connector of the plurality of connectors configured to receive a third signal of the plurality of signals, wherein the third signal is at a third wavelength, the third wavelength being different from the first and second wavelengths, the third connector comprising a third keyed portion on a first surface of the third connector a third distance from a side of the third connector, and the third distance being different from the first and second distances.

10. The cable of claim 9, further comprising a fourth connector of the plurality of connectors configured to receive a fourth signal of the plurality of signals, wherein the fourth signal is at a fourth wavelength, the fourth wavelength being different from the first, second, and third wavelengths, the fourth connector comprising a fourth keyed portion on a first surface of the fourth connector a fourth distance from a side of the fourth connector, and the fourth distance being different from the first, second, and third distances.

11. A method for networking, the method comprising:
providing a cable comprising:
a single connector configured for insertion into a first receptacle so as to receive a plurality of signals from the receptacle;
a first connector of a plurality of connectors configured to receive a first signal of the plurality of signals, wherein the first signal is at a first wavelength, the first connector comprises a first keyed portion on a first surface of the first connector a first distance from a side of the first connector;
a second connector of the plurality of connectors configured to receive a second signal of the plurality of signals, wherein the second signal is at a second wavelength, the second wavelength is different from the first wavelength, the second connector comprises a second keyed portion on a second surface of the second connector a second distance from a side of the second connector, and the first distance is different than the second distance; and
a plurality of transmission lines, each transmission line having a respective first end connected to the single connector so as to receive a respective signal of the plurality of signals and each of the transmission lines having a respective second end coupled to a respective one of the plurality of connectors;
inserting the single connector into a receptacle in a network hub;
inserting the first connector into a first transceiver, wherein the first keyed portion mates with a keyed portion on the first transceiver; and
inserting the second connector into a second transceiver, wherein the second keyed portion mates with a keyed portion on the second transceiver.

12. The method of claim 11, wherein the first keyed portion comprises a protrusion extending from the first surface.

13. The method of claim 11, wherein the first transceiver is configured to receive the first signal at the first wavelength.

14. The method of claim 13, wherein the second transceiver is configured to receive the second signal at the second wavelength.

15. The method of claim 14, wherein the cable further comprises wavelength selection optics associated with the transmission lines so that the first transceiver receives and conveys the first signal only at the first wavelength and the second transceiver receives and conveys the second signal only at the second wavelength.

16. The method of claim 15, wherein the wavelength selection optics comprises one or more of a wavelength splitter and an optical wavelength-division demultiplexer, a transmission diffraction grating, a wavelength selection filter, an optical wavelength-division demultiplexer.

17. The method of claim 11, wherein the cable is an optical cable, the single connector is a single optical connector, the first receptacle is an optical receptacle, the plurality of signals is a plurality of optical signals, and the plurality of transmission lines is a plurality of optical transmission lines.

18. A method for producing a cable, the method comprising:
providing a single connector configured for insertion into a first receptacle so as to receive a plurality of signals from the receptacle;
providing a first connector of a plurality of connectors configured to receive a first signal of the plurality of signals, wherein the first signal is at a first wavelength, the first connector comprises a first keyed portion on a first surface of the first connector a first distance from a side of the first connector;
providing a second connector of the plurality of connectors configured to receive a second signal of the plurality of signals, wherein the second signal is at a second wavelength, the second wavelength is different from the first wavelength, the second connector comprises a second keyed portion on a second surface of the second connector a second distance from a side of the second connector, wherein the first distance is different than the second distance; and providing a plurality of transmission lines, each transmission line having a respective first end connected to the single connector so as to receive a respective signal of the plurality of signals and each of the transmission lines having a respective second end coupled to a respective one of the plurality of connectors.

19. The method of claim 18, wherein the first keyed portion comprises a protrusion extending from the first surface.

20. The method of claim 19, wherein the first keyed portion is configured to mate with an indentation on a first transceiver, wherein the first transceiver is configured to receive the first signal at the first wavelength.

* * * * *